United States Patent [19]

Rossi

[11] Patent Number: 5,734,487
[45] Date of Patent: Mar. 31, 1998

[54] COMPUTER SYSTEM INCORPORATING AN INFRARED LINK FOR REDUCED INTERFERENCE COMMUNICATION WITH A RADIO TRANSCEIVER

[75] Inventor: Markku J. Rossi, Houston, Tex.

[73] Assignee: Compaq Computer Corporation, Houston, Tex.

[21] Appl. No.: 681,670

[22] Filed: Jul. 29, 1996

Related U.S. Application Data

[63] Continuation of Ser. No. 268,268, Jun. 30, 1994, Pat. No. 5,564,020.

[51] Int. Cl.$^6$ .............................. H04B 10/10; H04J 14/02
[52] U.S. Cl. .................. 359/145; 359/172; 359/133; 455/575
[58] Field of Search ........................ 455/41, 89, 90, 455/575; 359/124, 145, 146, 172, 133

[56] References Cited

U.S. PATENT DOCUMENTS

| | | | |
|---|---|---|---|
| 2,100,348 | 11/1937 | Nicolson | 359/133 |
| 4,620,192 | 10/1986 | Collins | 342/128 |
| 4,622,681 | 11/1986 | Snell | 375/275 |
| 4,796,301 | 1/1989 | Uzawa et al. | 359/172 |
| 5,239,295 | 8/1993 | Deluca | 340/825.44 |
| 5,280,498 | 1/1994 | Tymes | 375/200 |
| 5,387,994 | 2/1995 | McCormack et al. | 359/172 X |
| 5,564,020 | 10/1996 | Rossi | 395/200.15 |

FOREIGN PATENT DOCUMENTS

| | | | |
|---|---|---|---|
| 261449 | 10/1988 | German Dem. Rep. | 359/133 |
| 61-26339 | 2/1986 | Japan | 359/133 |

*Primary Examiner*—David L. Robertson
*Attorney, Agent, or Firm*—Pravel, Hewitt, Kimball & Krieger

[57] ABSTRACT

Two units are disclosed, one of which is installed in the computer and one of which is located remotely and includes the antenna and radio frequency transmitter and receiver elements. The two units communicate over an infrared (IR) link. The data is transmitted between the two units as real and imaginary components using separate IR signals. By using real and imaginary digitized signals, great flexibility is provided as to the actual contents and protocols capable of being utilized and serial digital data can be provided from the computer and received in the computer using only simple table look-ups. The antenna unit includes personalization byway of differing filters and software to allow it to operate with a plurality of radio channels and protocols. Each unit has a serial number to identify itself and to keep a communication link secure once established. The IR link is established by hitting an initialization switch on each of the two units, at which time they commence transmitting their serial numbers and an acknowledgement process occurs. Once this initialization has occurred and both units have registered the other unit, only communications from the proper serial number provider are accepted. After the initialization phase, data and commands are sent between the two units in a packetized structure which allows error checking as necessary.

10 Claims, 7 Drawing Sheets

FIG. 5

| SYNC KEY | SERIAL NO. | SYSTEM TYPE | COMMAND OR DATA | COMMAND & INCLUDED DATA OR DATA BITS | CHECKSUM |

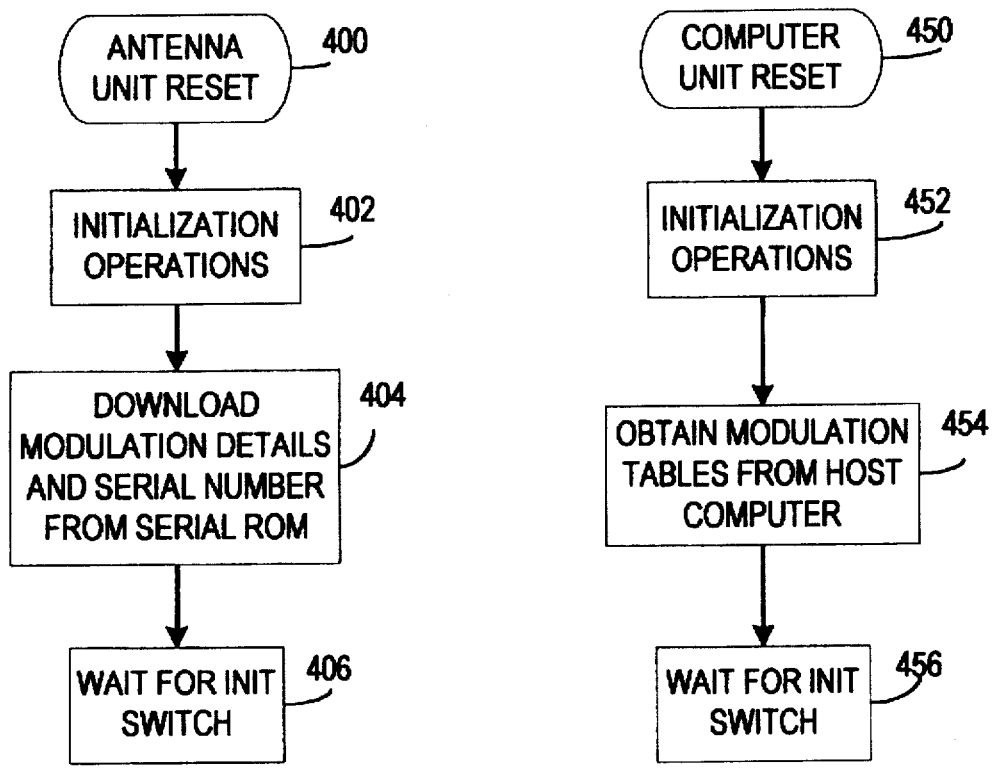
FIG. 6
FIG. 7
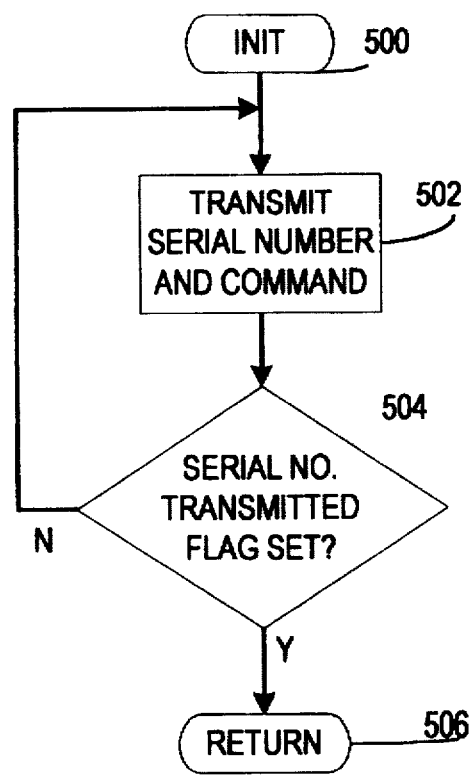
FIG. 8

COMPUTER SYSTEM INCORPORATING AN INFRARED LINK FOR REDUCED INTERFERENCE COMMUNICATION WITH A RADIO TRANSCEIVER

This is a continuation of application Ser. No. 08/268,268 filed Jun. 20, 1994, now U.S. Pat. No. 5,564,020.

BACKGROUND OF THE INVENTION

1. FIELD OF THE INVENTION

The invention relates to computer communications and more particularly to communications over a radio frequency channel.

2. DESCRIPTION OF THE RELATED ART

Computer communications are developing at a hectic pace. In the past, communications between computers was primarily done over telephone lines, be they dedicated when higher speeds were desired or conventional switched lines when lower costs were desired and lower speeds were acceptable. Recently, a revolution started in computer communications. This was the advent of computers communicating over radio frequency channels. Examples include desktop computers connected over a wireless area network and laptop computers connected to or including cellular telephones to allow conventional modem communications over a cellular link. The use of the radio frequency channels has allowed greatly improved flexibility and location of the computer, be it a desktop or a laptop unit. No longer is the user required to keep the computer within wires length distance of the appropriate connection. The computer is free to be moved to the desired physical location, and indeed in the case of a laptop computer could even be travelling along in an automobile. In addition, this great flexibility allows greater communications when laptop and notebook computers are used. The user may call over the cellular link from any location, even if no telephone lines are readily available. Further, the capabilities are being dramatically increased as more and more radio frequency channels are being developed and more protocols are being provided. Each of these particular channels and protocols have certain advantages and thus the user is free to choose depending upon location, available services and desired capabilities.

However, one common factor has become quite apparent in these early days of radio frequency communications using computer systems. This common factor has been that the computer generates a great deal of radio frequency interference or RFI. While the computers are generally sufficiently noise free that they may pass applicable standards, such as FCC Class B for consumer use, it has been determined that even with these relatively low noise computer systems, the RFI levels are still sufficiently high, particularly at the desired radio frequencies, to make reception, and in some cases transmission, of signals over the radio frequency channels problematic. In part, this is because the antenna is typically located closely adjacent the computer. Thus the antenna is directly in the field of the primary interference source. In the past this would have been remedied in a simple fashion simply by having the antenna installed at a remote location sufficiently far from the interference source and running a cable, such as a co-axial cable, between the antenna and the transmitter and receiver. However, this again brings back the limitations of cables and all the problems associated therewith. The computer user must locate the computer, place the antenna in the desired location and string a cable between the two. This is inconvenient in desktop installations and basically impractical in many laptop environments. Therefore it is desirable to be able to have the improved radio environment where the antenna is located at a sufficient distance from the computer to remove it from the high noise environment and yet it is also desired that the communications between the antenna and the computer be wireless.

Further, as noted above, there are numerous radio frequency channels and protocols being developed. It would be desirable to not only provide this remote antenna capability, but also to allow the capability to utilize numerous of the radio frequency channels and protocols with essentially the same unit, thus reducing costs.

SUMMARY OF THE PRESENT INVENTION

The present invention addresses the interference problems by providing two units, one of which is installed in the computer and one of which is located remotely and includes the antenna and radio frequency transmitter and receiver elements. The two units communicate over an infrared (IR) link which is thus not effected by the RFI developed by the computer. Because of the use of the IR link, no wires need be utilized and yet the antenna can readily be placed at a distance from the computer to allow improved communications.

The data is transmitted between the two units as real and imaginary components using separate IR signals. By using real and imaginary digitized signals, great flexibility is provided as to the actual contents and protocols capable of being utilized. For example, conventional modem data can be transmitted but so can differently modulated digital data for wireless area network use. In addition, by using the real and imaginary transformations, serial digital data can be provided from the computer and received in the computer using only simple table look-ups, thus not requiring large amounts of processing power in the computer unit. This saves on size and cost of that particular unit.

The antenna unit includes personalization by way of differing filters and software to allow it to operate with a plurality of radio channels and protocols. The operating radio frequency of the antenna is programmable to work with the various channels and protocols. The antenna unit includes a digital signal processor (DSP) to perform the necessary conversions and protocol and data operations. The performance level of the DSP can be selected based on the radio channel to be used.

Each unit has a serial number to identify itself and to keep a communication link secure once established. The IR link is established by hitting an initialization switch on each of the two units, at which time they commence transmitting their serial numbers and an acknowledgement process occurs. Once this initialization has occurred and both units have registered the other unit, only communications from the proper serial number provider are accepted. After the initialization phase, data and commands are sent between the two units in a packetized structure which allows error checking as necessary. The data rate is sufficient to allow communication at the speeds of conventionally available radio channels, such as up to 20 k bits per second.

BRIEF DESCRIPTION OF THE DRAWINGS

A better understanding of the present invention can be obtained when the following detailed description of the preferred embodiment is considered in conjunction with the following drawings, in which:

FIG. 5 is a representation of the packet transmitted between the computer unit and the antenna unit; and FIGS. 6, 7, 8 and 9 are flowcharts of operations of the computer unit and the antenna unit according to the preferred embodiment.

DETAILED DESCRIPTION OF THE PREFERRED EMBODIMENT

Figure 1A:
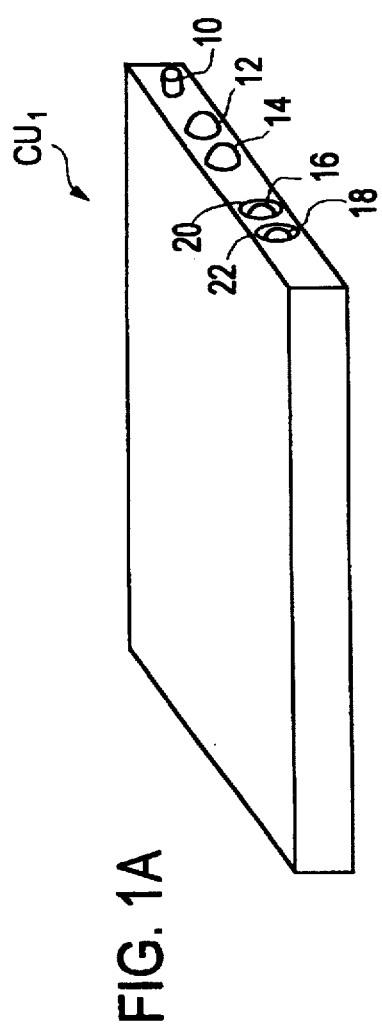
FIGS. 1A and 1B are perspective view of alternative embodiments of the computer unit according to the present invention.

Referring now to FIG. 1A, a computer unit CU1 is shown. The computer unit CU1 is preferably in a PCMCIA Type II form factor to allow insertion in laptop computers. The computer unit CU1 therefore preferably has a generally rectangular shape. At the end opposite the PCMCIA connector are provided a series of diodes 12, 14, 16 and 18 and an initialization switch 10. Transmitter LEDs such as infrared (IR) LEDs 12 and 14 are provided. Photodiodes or phototransistors 16 and 18 are provided in recessed locations 20 and 22. Preferably the photodiodes 16 and 18 are recessed to avoid interference from the transmitting LEDs 12 and 14. Preferably, LEDs 12 and 14 transmit at different wave lengths and the photodiodes 16 and 18 receive at complementary wave lengths so that interference is not developed between the two LEDs 12 and 14.

Figure 1B:
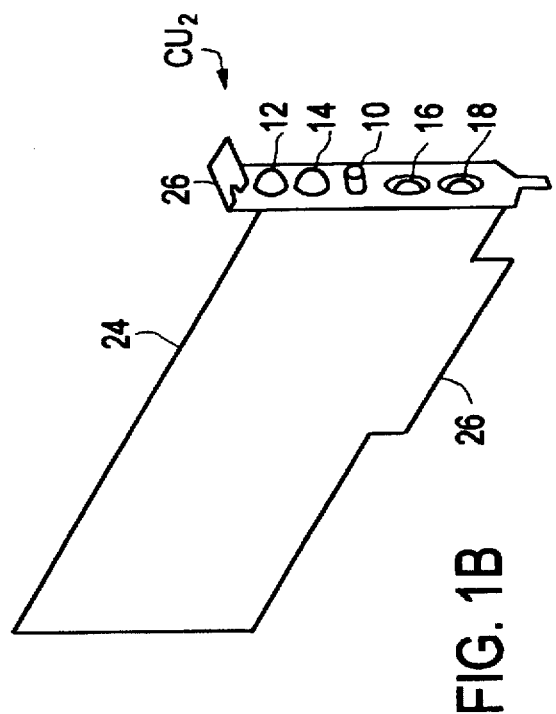

FIG. 1B shows an alternative embodiment for installation in a desktop computer such as one according to the IBM PC compatible standard. To this end, a circuit board 24 is provided with a card end 26 which contains the LEDs 12 and 14, the photodiodes 16 and 18 and the initialization switch 10. A card edge connector 26 is provided to mate with an appropriate slot in the computer.

Figure 1C:
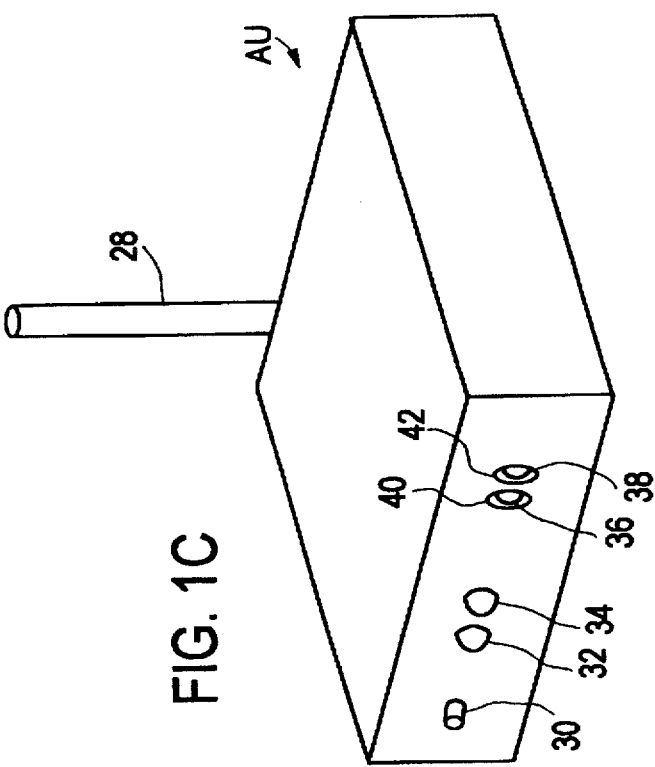
FIG. 1C is a perspective view of an embodiment of the antenna unit according to the present invention.

Referring now to FIG. 1C, the antenna unit AU is illustrated. The antenna unit AU is preferably a generally rectangular housing, but of course other form factors could be used if desired. The antenna unit AU is powered by an appropriate source, such from an AC adaptor connected to a wall outlet or a DC adaptor connected to a cigarette lighter. The antenna unit AU can also include batteries if desired to allow completely remote operation. The antenna unit AU includes an antenna 28 which is used to provide the radio channel as well as an initialization button 30, transmitting IR LEDs 32 and 34 and receiving photodiodes or phototransistors 36 and 38, also again preferably contained in recesses 40 and 42. The photodiodes 36 and 38 are complementary with the LEDs 12 and 14, while the LEDs 32 and 34 are complementary with the photodiodes 16 and 18. Preferably the LEDs 12, 14, 32 and 34 have a relatively narrow angle of dispersion to limit interference between units should multiple units be installed or present in a single environment.

Figure 2:
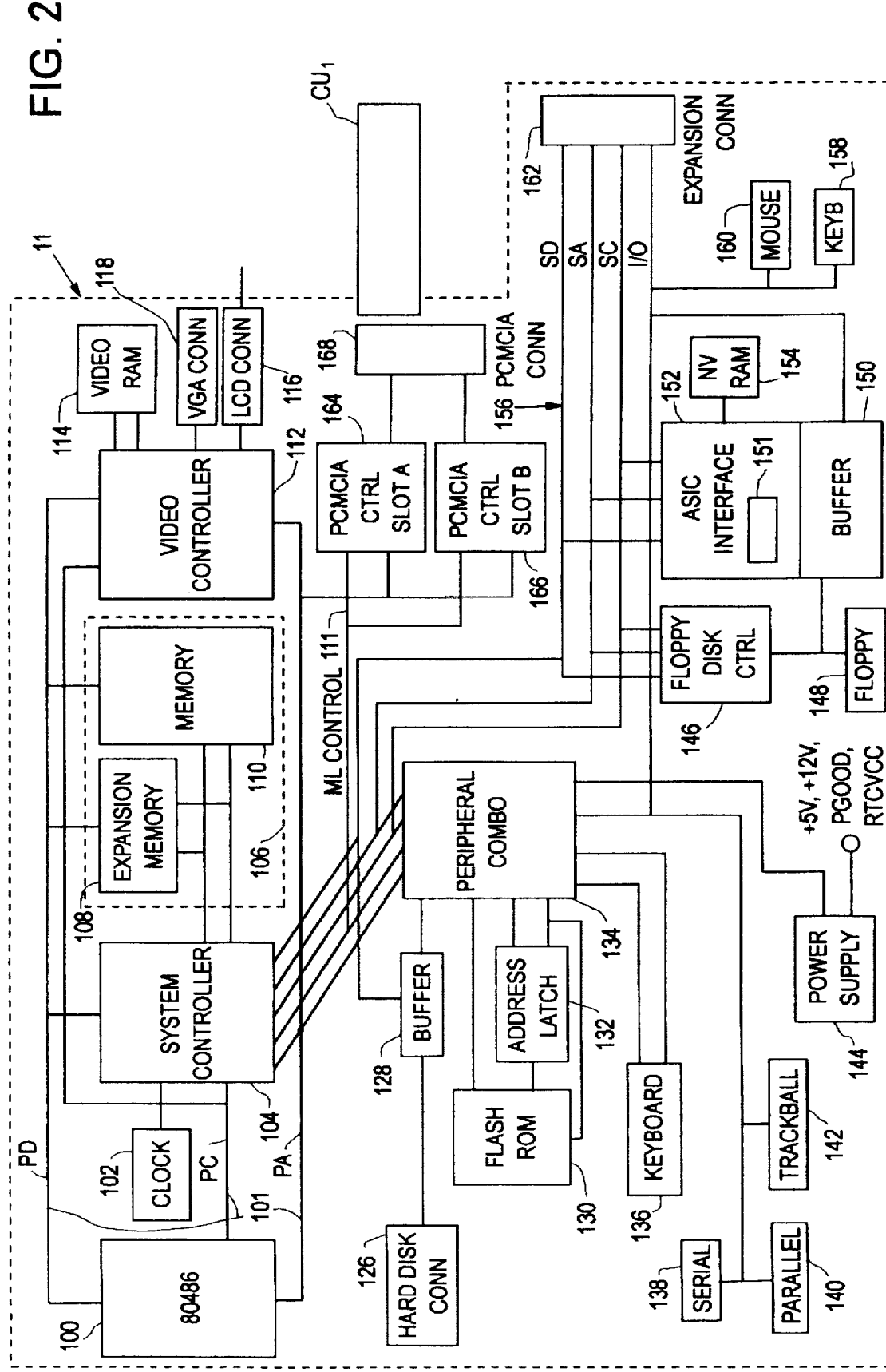
FIG. 2 is a block diagram of a laptop computer for receiving the computer unit of FIG. 1A.

Referring now to FIG. 2, an exemplary laptop computer 11 is shown. While numerous details of the computer 11 are provided, they are provided only as an exemplary description and it is understood that other laptop computer architectures as well as desktop computer architectures could be utilized according to the present invention.

A microprocessor or CPU 100, preferably an S-series i486 processor from Intel Corporation (Intel), forms the main computing element of the computer 11. The microprocessor 100 is connected to a system controller 104 via a local bus 101, which consists of three buses: a PD or processor data bus, a PA or processor address bus and a PC or processor control bus. Connected to the system controller 104 is a clock generator 102. Included as part of the system controller 104 is a memory controller, which provides the proper address and control signals to main memory 106. The main memory 106 is connected to the PD or processor data bus. The main memory 106 includes a base memory 110, which is configured to 4 Megabytes or 8 Megabytes in the preferred embodiment, and is upgradable with expansion memory 108. The system controller 104 also provides certain control signals on an ML control bus 111. The ML control bus 111 signals are used in conjunction with address and data signals placed on the PA bus by the system controller 104 during intervals when the system controller 104 has gained access to the PA bus from the processor 100. This dual use of the PA bus reduces the pin count of the system controller 104.

An ISA bus 156 is also included as part of the computer 11. The ISA bus 156 has four major components, the SA or system address bus, the SD .or system data bus, the SC or system control bus and the I/O bus. The system controller 104 further includes control circuitry that provides the necessary capabilities to convert between local bus 101 cycles and ISA bus 156 cycles. The system controller 104 also includes buffers to provide the necessary data and address transceiving functions between the local bus 101 and the ISA bus 156.

The computer 11 includes certain fundamental components such as an interrupt system, a DMA controller and a number of timers, as well as arbitration of the ISA bus 156. These functions are all contained in a peripheral controller 134, which is connected to the SA, SC, I/O, PA and ML control buses. The peripheral controller 134 also provides the necessary.control signals to a hard disk buffer 128, which is connected between the SD bus and a hard disk connector 126 for connection with a hard disk drive 127. The peripheral controller 134 also provides an interface to a keyboard 136, an internal trackball 142, a serial port 138 and a parallel port 140. In addition, the peripheral controller 134 provides control signals for a FLASH EEPROM 130, which stores certain basic operating routines to allow the computer to boot and perform certain fundamental system functions. These routines are generically referred to as the system BIOS. A portion of the EEPROM 130 is used to store the Video BIOS, which is used to initialize the video system. That portion of the EEPROM 130 is generally referred to as the Video BIOS ROM.

A power supply 144 provides the power supply voltages for the computer 11. The voltages generated by the power supply 144 includes a 3.3 volt power voltage +3.3 V, a 5 volt power voltage +5 V, a 12 volt power voltage +12 V, a signal PGOOD indicating the availability of system power and a voltage RTCVCC. The voltage RTCVCC is connected to a real time clock (RTC) and a CMOS memory located in the system controller 104.

A floppy disk controller 146 is connected to the ISA bus 156. The floppy disk controller 146 provides control signals to a floppy disk drive (not shown) through a connector 148. The floppy disk controller 146 also provides data and address transceiving between the SD and SA buses, respectively, and the floppy disk drive. Connected between the floppy connector 148 and the I/O bus is a buffer 150. The buffer 150 is implemented inside an ASIC 152. The ASIC 152 also provides control signals for an NVRAM 154, which is non-volatile memory for storage of configuration and status information.

An expansion connector 162 is connected to the ISA bus 156 for connection to the expansion base unit 20 for docking purposes. Also connected to the I/O bus are a mouse port 160 and a keyboard port 158 for connection with an external mouse and external keyboard, respectively. A PCMCIA connector 168 has two PCMCIA slots, which provide expansion capabilities for the computer 11 to provide additional memory if desired or to receive certain communication options, such as modems and networks cards. The two PCMCIA slots in the connector 168 are connected to two PCMCIA controllers 164 and 166. The PCMCIA controller 164 is used for the control of PCMCIA slot A and the PCMCIA controller 166 is used for the control PCMCIA slot B. The PCMCIA controllers 164 and 166 are connected to the PA and ML control buses. A computer unit CU1 is shown in position for installation in one of the PCMCIA slots.

The video system in the notebook computer 11 comprises a video controller 112, a Video Random Access Memory (VRAM) 114, an LCD connector 116, a VGA connector 118, and an LCD panel (not shown). The video controller 112 is connected to the local bus 101, and it provides video and control signals to the LCD panel through the LCD connector 116. The video controller 112 also can provide video signals to an external CRT monitor (not shown) through the VGA connector 118. The VRAM 114 is connected to the video controller 112 for storage of video data, and the video ROM 113 contains the power up information for the video controller 112.

In a desktop computer embodiment, slots are provided on the ISA bus 156 to receive computer units CU2.

Figure 3:
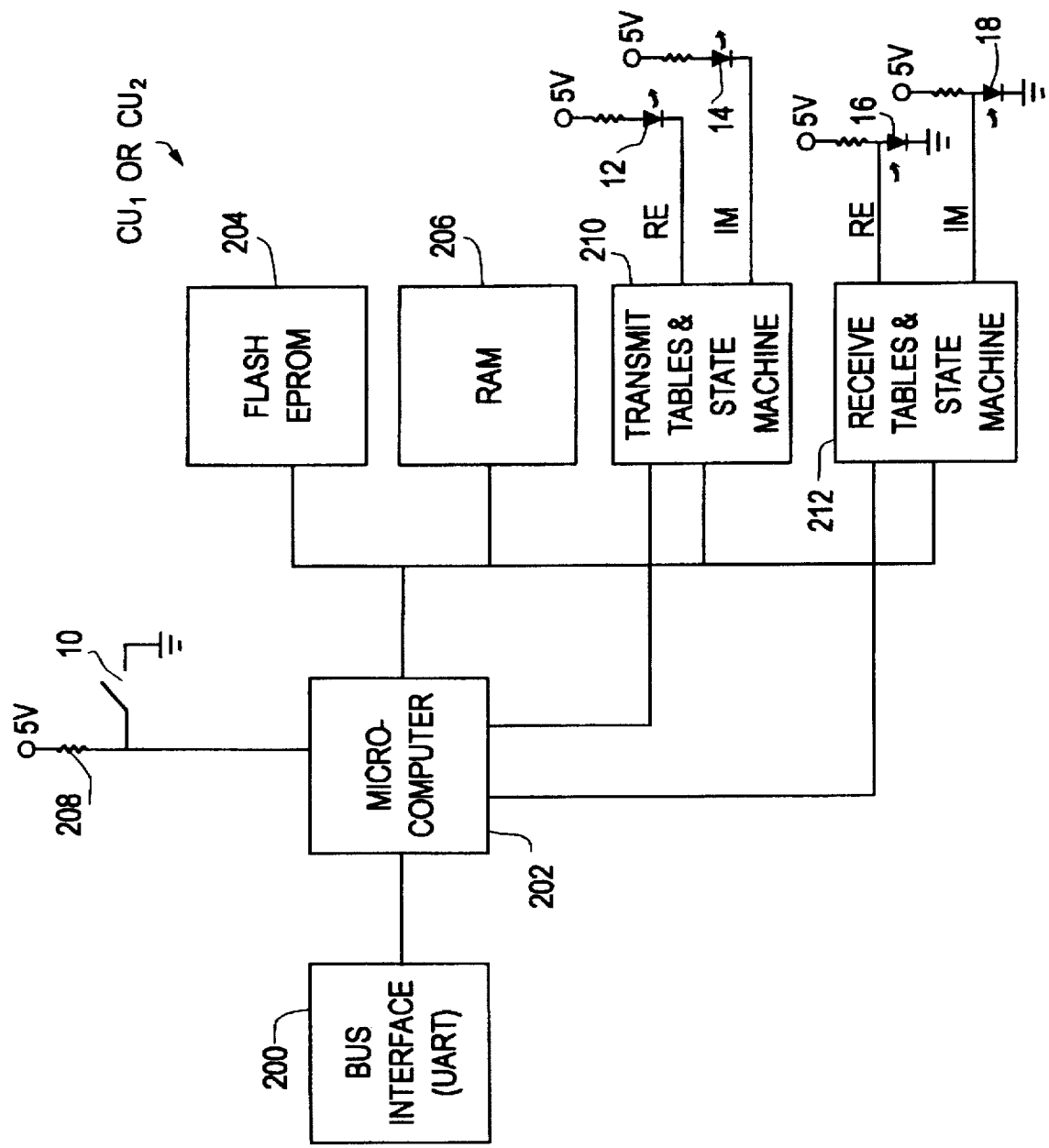
FIG. 3 is a block diagram of the computer units of FIGS. 1A and 1B.

Proceeding now to FIG. 3, a block diagram of the computer units CU1 and CU2 is shown. A bus interface module 200, which is primarily a UART, is provided to connect to the computer 11 in a manner according to the particular interface protocol chosen, such as PCMCIA, ISA or so on. The bus interface module 200 includes a serial output provided to a microcomputer 202 which controls the operation of the control units CU1 and CU2. The microcomputer 202 is preferably an 8 bit or 16 bit microcomputer as conventionally available. Connected to the microcomputer 202 over an address and data bus are flash EPROM 204 and random access memory (RAM) 206. Flash EPROM 204 is preferably a boot block type part to retain certain minimal operating routines of the microcomputer 202 in the boot block and to receive particular program code provided from the computer 11 in the remaining portions. The initialization switch 10 is connected to the microcomputer 202 by means of a pull-up resistor 208 to provide an indication when initialization of the computer unit CU1 or CU2 is requested.

Additionally connected to the microcomputer 202, is a transmit tables and state machine block 210. The transmit block 210 includes the tables and state machines necessary to convert from the binary serial data stream provided via the microcomputer 202 to real and imaginary digitized binary values which are transmitted using the LEDs 12 and 14. It is well known to those skilled in the art that typical analog wave forms such as those often used in modem communications can be described in terms of real and imaginary components. The transmit module 210 includes look-up tables properly encoded to provide the appropriate real and imaginary digitized bit stream representative of the particular analog function which would otherwise result from the modem or other desired function of the computer unit CU1 and CU2. For example, if the computer unit CU1 and CU2 were to emulate a modem, the microcomputer 202 would provide a serial bit stream of the modem data to the transmit block 210. The transmit block 210 would then appropriately convert each serial bit or series of bits into a series of digitized bits representative of the particular analog signal that would otherwise result if conventional modem processing were developed. In the preferred embodiment, each bit of data provided from the microcomputer 202 in a modem environment is converted to 12 digitized voltage samples, with each sample having a resolution of 8 bits. It is understood that this is done for each of the real and imaginary components, which are then respectively provided through the LEDs 12 and 14. As the preferred transmission rate using the LEDs 12 and 14 is approximately 2 Mbits per second, this provides an effective data rate of approximately 20 kbps, which is effectively the limit for most available radio channels and protocols.

The microcomputer 202 also provides the capabilities for data compression, such as V.42 and V.42 bis, and Trellis encoding/decoding and similar if utilized. These operations are performed on the data received from the bus interface 200 before the serial data is provided to the transmit block 210.

The transmit block 210 includes the necessary state machines to properly sequence the table look up for each particular bit received and to provide command information when necessary. Preferably when the microcomputer 202 which is to send command information to the antenna unit AU, only the real channel is utilized and the command packet and data is provided in a direct digital format with no table encoding or digitizing.

The transmit block 210 also includes the logic necessary to develop command and data packets as shown in FIG. 5. Preferably each command packet commences with a synchronization key, which is then followed by a unique serial number to identify the particular unit. Each computer unit CU1 and CU2 and antenna unit AU has an individual serial number to enable secure communication, as described below. Following the serial number, in the preferred embodiment the command packet includes the system type, that is, the particular encoding state of the data being provided. For instance, a system type would change between particular bit rates, modulation methods and so on. Following the system type is a single bit to indicate whether command or data information is being transferred. If command data is being transferred, the bit is followed by a value indicating the command and any data associated with that command. Alternatively, if data is being transmitted, a series of data bits, for example up to 8,000 data bits representing approximately 80 bits of serial binary data in a typical modem case, would be transmitted. The final portion of the command packet is a checksum value to allow error detection and correction. The command packets can be provided over the real channel, with the imaginary channel providing only data packets so that the packet information could be simplified if desired. A negative of using the real channel for all command packets is that data cannot be transferred when commands are being transferred, as usually both the real and imaginary channels must be transmitting data packets for data flow. However, this arrangement may simplify command packet decoding to render this alternative feasible.

In one embodiment the table data contained in the transmit block 210 is fixed, thus effectively functioning as a single rate or function device. In an alternate embodiment, the table data can be received from the host or notebook computer 11 through the microcomputer 202 and loaded into the transmit block 210 with appropriate programming. This allows the computer unit CU1 and CU2 to have multiple functions without redesigning the hardware completely.

A receive table and state machine block 212 is similarly connected to the microcomputer 202 and is complementary to the transmit block 210 in that it receives data from the photodiodes 16 and 18 and converts this digitized data into the proper binary bits to be provided to the microcomputer 202. When either the transmit block 210 or the receive block 212 have completed operations, they provide signals to the microcomputer 202 to interrupt its operations to inform of this completed status.

Thus it can be seen the components in the computer unit CU1 and CU2 are relatively simple digital components so that it can be produced cheaply and fit in a very small package.

Figure 4:
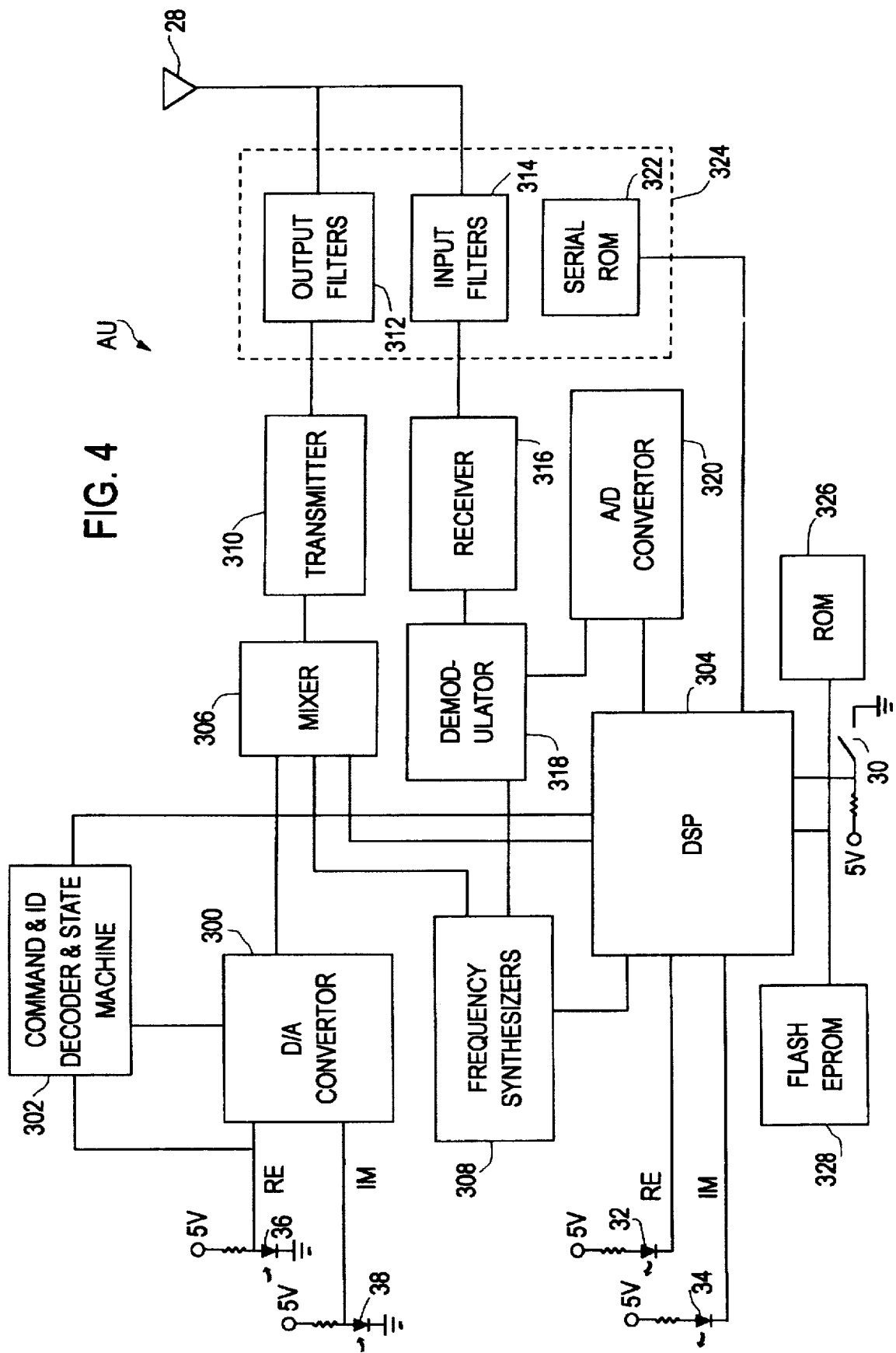
FIG. 4 is a block diagram of the antenna unit of FIG. 1C.

Proceeding now to FIG. 4, the antenna unit AU is shown. The photodiodes 36 and 38 are connected to a digital/analog (D/A) converter 300. The photodiode 36 is also connected to an input of a command and ID decoder and state machine 302. The D/A converter 300 receives the digitized analog waveform being transmitted over the real and imaginary IR links and appropriately converts these two signals to provide the analog signals which would have otherwise been developed by the function of the computer unit CU1 and CU2. The real channel is provided to the command and ID decoder and state machine 302 to allow synchronization of the D/A converter 300 so that it does not convert improper portions of the packet, such as the synchronization key and serial number or checksum and also to allow detection of command packets when they are transmitted.

The command and ID decoder and state machine 302 is connected to a digital signal processor (DSP) 304 which controls the operation of the command and ID decoder and state machine 302 and which it interrupts upon receipt of command or data packets as appropriate. In the preferred embodiment, the DSP 304 performs the necessary modulation and demodulation operations for the particular network and protocol and performs the necessary protocol operations. Therefore the capability of the DSP 304 varies depending upon the particular radio network and protocol and compression and encoding techniques used. The DSP 304 is responsible for the V.42 and V.42 bis compression and Trellis encoding/decoding for data received over the radio channel and provided to the computer unit CU1 or CU2. For example, a number of the radio channels such as AMPS, TACS, CDPD and so on have relatively simple processing requirements and therefore the DSP 304 can be a lower performance unit. In other cases, such as GSM, ARDIS at 19,200 baud, U.S. and Japanese cellular digital telephone interfaces and others require significantly more processing and therefore a higher performance DSP unit 304 can be utilized. As a result, the user has an option of purchasing a higher performance unit if operation with the more complicated protocols is desired, while if not a lower priced unit can be purchased due to the use of a less powerful DSP 304.

The analog outputs of the D/A converter 300 are provided as inputs to a mixer 306. Another input of the mixer 306 is provided by a frequency synthesizer 308 which is controlled by the DSP 304. The frequency synthesizer 308 provides the base frequency for operation with the particular radio channel. A fourth input to the mixer 306 is provided from the DSP 304 to allow inclusion of appropriate command and control information over the radio channel. The mixer 306 is preferably double balanced type which combines the real and imaginary analog signals from the D/A converter 300 and the base frequency for data transmission or the DSP 304 information and the base frequency for command and control transmission. The output of the mixer 306 is provided to the radio frequency transmitter 310, which has its output connected to a series of output filters 312. It is noted that the transmitter 310 can be continuous or pulsed, depending on the radio network requirements. It is also noted that the transmitter 310 is programmable to provide different modulation schemes. The output of the output filters 312 is connected to the antenna 28 for transmission.

The antenna 28 is also connected to a series of input filters 314, whose output is connected to the input of a radio frequency receiver 316. The output of the receiver 316 is provided to a programmable demodulator 318 which removes the carrier frequency as provided from the frequency synthesizer 308. The demodulated output is provided from the demodulator to an A/D converter 320, which provides its output to the DSP 304. In this manner, the DSP 304 receives the incoming signal from the radio channel and can perform processing as desired. Part of this processing will include converting it into the proper table format for transmission on the real and imaginary IR links to the computer unit CU1 or CU2. Not shown for simplicity are control signals from the DSP 304 to the D/A converter 300, the transmitter 310 and the receiver 316 to disable their respective outputs as needed.

A serial ROM 322 is also connected to the DSP 304. In the preferred embodiment the output filters 312, the input filters 314 and the serial ROM 322 are provided on a separate daughter board or interchangeable card 324. This allows simple changing of the radio network and protocol without requiring completely new units or major modifications. The frequency synthesizer 308 allows simple selection of the desired radio frequency and the output and input filters 312 and 314 can then be tuned to properly work with the antenna 28 for that particular portion of the radio spectrum. The serial ROM 322 provides the software necessary for operation according to the particular radio network protocol and may include necessary table data. Further, the serial ROM 322 can also provide a user ID for the particular radio network.

The DSP 304 is further connected to a read only memory (ROM) 326 which includes its basic operating routines and to a flash EPROM 328 which is loaded with the software from the serial ROM 322 upon reset of the antenna unit AU. The DSP 304 is connected to the LEDs 32 and 34 to properly provide IR output signals which are provided to the computer unit CU1 or CU2. In addition, the initialization switch 30 is connected to the DSP 304.

Referring now to FIG. 6, operation of the antenna unit AU upon reset is shown. The reset sequence 400 commences at step 402 where initialization operations occur. Control then proceeds to step 404 where modulation details, protocol information, real and imaginary table data and user identification or serial number are provided from the serial ROM 322. Control then proceeds to step 406 to await depression of the initialization switch 30. Similarly, the computer unit reset sequence 450 (FIG. 7) commences at step 452 where initialization operations occur. After initialization is complete, control proceeds to step 454 where the appropriate modulation tables are obtained from the host computer 11 where they are preferably stored on hard disk. After these have been loaded into the flash EPROM 204, and into the receive and transmit blocks 210 and 212, control proceeds to step 456 to await depression of the initialization switch 10.

Operations upon depressing the initialization switch 10 or 30 are similar for both units and are illustrated in FIG. 8. The initialization sequence 500 commences at step 502 where the particular unit, be it antenna unit AU or carrier unit CU, begins transmitting its serial number in a command packet indicating that this is the initialization sequence. Control then proceeds to step 504 to determine if a flag referred to as the serial number transmitted flag has been set. If not, control returns to step 502 so that the serial number is continuously transmitted. When the flag has been set, control proceeds from step 504 to step 506, where a return from the sequence occurs. With this the initialization phase will have been completed, so operations according to the necessary modulation technique can begin.

Figure 9:
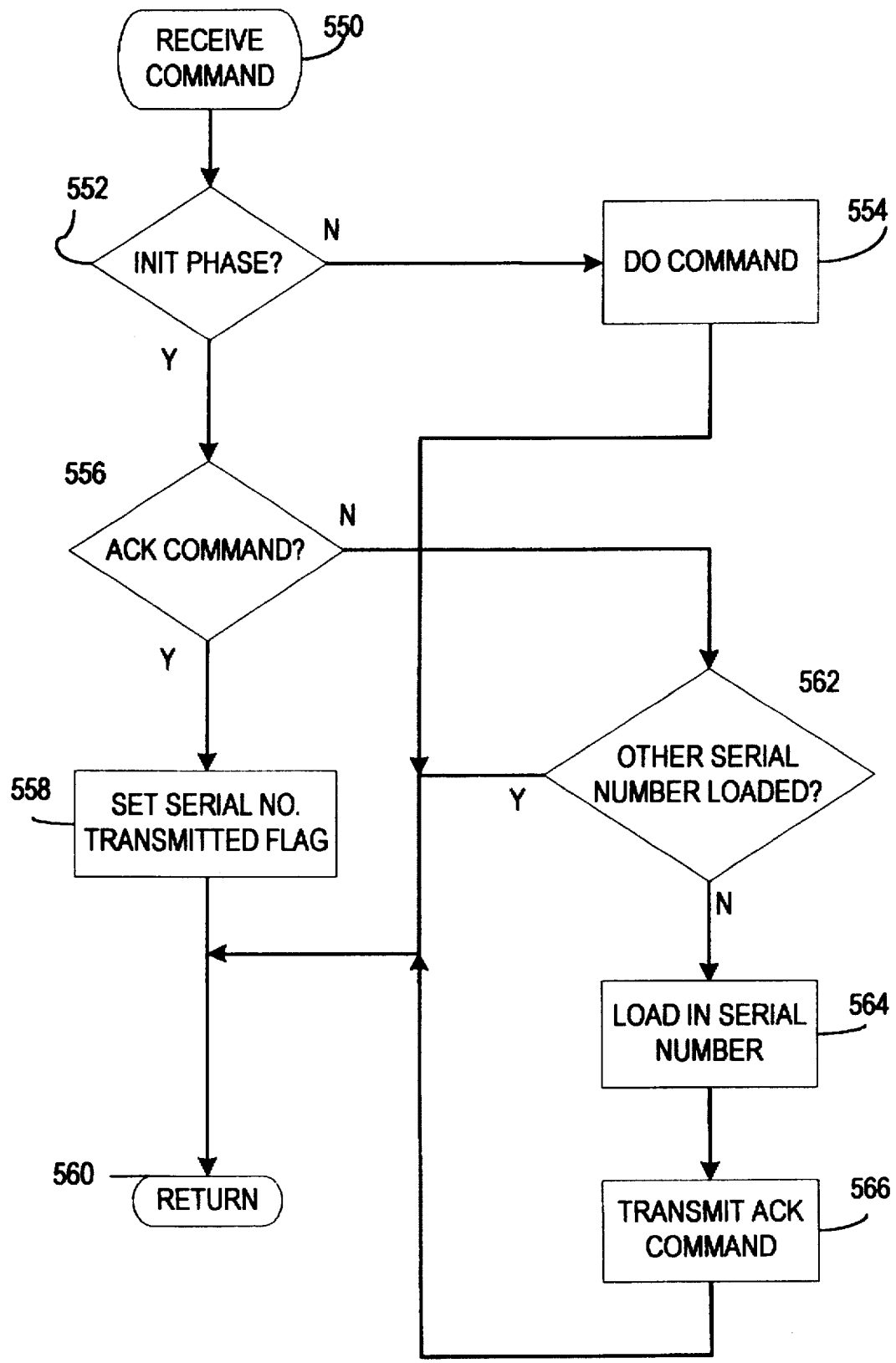

A receive command interrupt sequence 550 is shown in FIG. 9 and is similar for both the antenna unit AU and the computer unit CU. Upon receipt of an interrupt from either the receive block 212 or the command and ID decoder and state machine 302, control proceeds to step 552 to determine if initialization phase is occurring. This can be determined because a serial number transmitted flag is not yet set and no serial number of the other unit is present. If it is not initialization phase, control proceeds to step 554 as a command has been received and therefore it is appropriate to perform the particular command. It is noted that commands are performed only if the serial number in the command packet matches that previously stored by the unit. This reduces the chances of interference from other similar units in the area. Further, preferably the stored serial number is provided to the command and ID decoder and state machine 302 so that it can monitor incoming data packets. If the serial number is not a match, the command and ID decoder and state machine 302 disables the D/A converter 300 for that packet and informs the DSP 304 of the improper packet, so that appropriate action can be taken.

If initialization phase is occurring in step 552, control proceeds to step 556 to determine if this has been an acknowledge command, which indicates that the serial number of this unit has been received by the other unit. If so, control proceeds to step 558 where the serial number transmitted flag is set to indicate that the serial number of the particular unit has been received by the other unit and its existence acknowledged. After this, control proceeds to step 560 to continue operations. If it was not an acknowledge command as determined in step 556, control proceeds to step 562 to determine if the other serial number, i.e. the serial number of the companion unit, has been loaded. If so, control proceeds to step 560. If not, the serial number present in the particular command is loaded into memory in step 564. Control then proceeds to step 566 to transmit the acknowledge command to indicate to the other unit that its presence has been noted. Communication proceeds once both units have acknowledged. Control then proceeds to step 560.

Thus the user initializes the system by locating both units so that the LEDs and the photodiodes are in communication, that is, there is an optical path between them. The user then turns on both units and depresses both initialization buttons 10 and 30. The units then establish serial number links for security reasons and await operations from the user to transmit or receive data as appropriate.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:
1. A computer system communicating by infrared light with a remote radio frequency transceiver, the computer system comprising:
a data bus;
a serial communication interface device coupled to said data bus;
a microcomputer, coupled to said serial communication interface device, for providing and receiving serial data streams; and
a computer system transceiver circuit coupled to said microcomputer for infrared communication with the remote radio frequency transceiver, said computer system transceiver circuit comprising:
first and second infrared (IR) light emitting diodes (LEDs) having different IR wavelengths from each other for sending digital data streams to the remote radio frequency antenna;
first and second IR photodetectors responsive to received wavelengths of infrared light from the remote radio frequency transmitter and forming signals therefrom;
transmitter conversion circuitry for converting a data stream received from said microcomputer to real and imaginary component digitized streams for provision to said first and second IR LEDs, respectively; and
receiver conversion circuitry converting signals formed by said first and second IR photodetectors into real and imaginary digitized streams, respectfully, of digital data for provision to said microcomputer.

2. The computer system of claim 1, wherein said transmitter conversion circuitry converts said digital data stream to said real and imaginary component digitized streams representative of an analog waveform sent by an analog modem.

3. The computer system of claim 1, wherein said computer system is assigned a serial number and wherein said real and imaginary component digitized streams are provided to the remote radio frequency transmitter in a packet including said serial number.

4. The system of claim 3, wherein said computer system further includes initialization circuitry that provides said serial number to the remote radio frequency transmitter during initialization of said digital transceiver circuit, said initialization circuitry also cooperating with the remote radio frequency transmitter to receive a second serial number identifying the remote radio frequency transmitter, and wherein said receiver conversion circuitry converts said real and imaginary component digitized streams only if the serial number of a received packet matches said second serial number.

5. The system of claim 4, wherein said initialization circuitry includes a switch operable to commence operation.

6. The computer system of claim 1, wherein said serial communication interface device is a universal asynchronous receiver and transmitter (UART).

7. The computer system of claim 1, further comprising a memory device coupled to said microcomputer for providing minimal operating routines to the microcomputer during system initialization and for receiving additional operating routines from other portions of the computer system.

8. The computer system of claim 1, further comprising a memory device coupled to said digital transceiver circuit for receiving and storing information for controlling the conversions of the real and imaginary component digitized streams.

9. The computer system of claim 1, wherein said microcomputer and said computer system transceiver circuit are incorporated on an expansion bus card.

10. A computer system communicating by infrared light with a remote radio frequency transceiver, the computer system comprising:

a data bus;

a serial communication interface device coupled to said data bus;

a microcomputer, coupled to said serial communication interface device, for providing and receiving serial data streams; and a computer system transceiver circuit coupled to said microcomputer for infrared communication with the remote radio frequency transceiver, said computer system transceiver circuit comprising:

first and second infrared (IR) light emitting diodes (LEDs) having different IR wavelengths from each other for sending digital data streams to the remote radio frequency antenna;

first and second IR photodetectors responsive to received wavelengths of infrared light from the remote radio frequency transmitter and forming signals therefrom;

transmitter conversion circuitry for converting a data stream received from said microcomputer to digital data streams representative of real and imaginary components of analog signals sent by an analog modem, said digital data streams being provided to said first and second IR LEDs, respectively; and receiver conversion circuitry converting signals formed by said first and second IR photodetectors into real and imaginary digitized streams, respectfully, of digital data for provision to said microcomputer.

* * * * *

UNITED STATES PATENT AND TRADEMARK OFFICE
CERTIFICATE OF CORRECTION

PATENT NO. : 5,734,487
DATED      : Mar. 31, 1998
INVENTOR(S): Markku J. Rossi

It is certified that error appears in the above-identified patent and that said Letters Patent is hereby corrected as shown below:

Col. 10, line 20, CLAIM 1, PLEASE DELETE "FIGHT" AND INSERT THEREFOR --LIGHT--.

COLUMN 11, LINE 15, CLAIM 10, PLEASE DELETE "IK" AND INSERT THEREFOR --IR--.

Signed and Sealed this

Sixteenth Day of June, 1998

Attest:

BRUCE LEHMAN

Attesting Officer

Commissioner of Patents and Trademarks